US012445774B2

(12) United States Patent
Han et al.

(10) Patent No.: US 12,445,774 B2
(45) Date of Patent: Oct. 14, 2025

(54) ELECTRONIC DEVICE, PULL-UP CIRCUIT, AND METHOD FOR SUPPRESSING POP SOUND OF EARPHONE

(71) Applicant: HONOR DEVICE CO., LTD., Shenzhen (CN)

(72) Inventors: Chao Han, Shenzhen (CN); Ting Huang, Shenzhen (CN); Xinmiao Yan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/553,823

(22) PCT Filed: Apr. 10, 2023

(86) PCT No.: PCT/CN2023/087223
§ 371 (c)(1),
(2) Date: Oct. 3, 2023

(87) PCT Pub. No.: WO2023/216787
PCT Pub. Date: Nov. 16, 2023

(65) Prior Publication Data
US 2025/0080907 A1 Mar. 6, 2025

(30) Foreign Application Priority Data
May 12, 2022 (CN) ........................ 202210515566.2

(51) Int. Cl.
*H04R 3/02* (2006.01)

(52) U.S. Cl.
CPC .......... *H04R 3/02* (2013.01); *H04R 2420/05* (2013.01); *H04R 2420/09* (2013.01)

(58) Field of Classification Search
CPC ... H04R 3/02; H04R 2420/05; H04R 2420/09
See application file for complete search history.

(56) References Cited

U.S. PATENT DOCUMENTS 10,893,360 B2 1/2021 Li et al.
11,611,825 B2 3/2023 Yu
(Continued)

FOREIGN PATENT DOCUMENTS

CN 106992372 A 7/2017
CN 207603855 U 7/2018
(Continued)

*Primary Examiner* — Mark Fischer
(74) *Attorney, Agent, or Firm* — Fish & Richardson P.C.

(57) ABSTRACT

This application relates to the technical field of circuits. An output terminal of the pull-up circuit is configured to be connected to a Type-C plug of the earphone through a MIC pin of the Type-C interface. The controller is configured to control the electronic device to be disconnected from an audio path of the earphone, control an access resistance value of the pull-up circuit to be a first resistance value, and identify normal/reverse insertion of the earphone based on a voltage of the MIC pin of the Type-C interface when the earphone is inserted into the Type-C interface of the electronic device through the Type-C plug. The controller is further configured to control the access resistance value of the pull-up circuit to be a second resistance value after the identification is completed, and the first resistance value is greater than the second resistance value.

17 Claims, 10 Drawing Sheets

(56) References Cited

U.S. PATENT DOCUMENTS

| | | | | |
|---|---|---|---|---|
| 2017/0127203 | A1 | 5/2017 | Ryu | |
| 2017/0293335 | A1 | 10/2017 | Dunstan et al. | |
| 2018/0246158 | A1 * | 8/2018 | Taylor ................ | H01R 13/6683 |
| 2019/0257869 | A1 | 8/2019 | Lee et al. | |
| 2024/0030915 | A1 | 1/2024 | Huang et al. | |

FOREIGN PATENT DOCUMENTS

| | | | |
|---|---|---|---|
| CN | 108513218 | A | 9/2018 |
| CN | 207868535 | U | 9/2018 |
| CN | 109586125 | A | 4/2019 |
| CN | 209460757 | U | 10/2019 |
| CN | 110891225 | A | 3/2020 |
| CN | 111294685 | A | 6/2020 |
| CN | 111464917 | A | 7/2020 |
| CN | 211742107 | U | 10/2020 |
| CN | 113672534 | A | 11/2021 |
| CN | 215068228 | U | 12/2021 |
| CN | 215268725 | U | 12/2021 |
| CN | 114630230 | A | 6/2022 |
| JP | 2018173886 | A | 11/2018 |
| WO | 2021164556 | A1 | 8/2021 |
| WO | 2022042199 | A1 | 3/2022 |

* cited by examiner

ELECTRONIC DEVICE, PULL-UP CIRCUIT, AND METHOD FOR SUPPRESSING POP SOUND OF EARPHONE

CROSS-REFERENCE TO RELATED APPLICATIONS

This application is a national stage of International Application No. PCT/CN2023/087223, filed on Apr. 10, 2023, which claims priority to Chinese Patent Application No. 202210515566.2, filed on May 12, 2022. The disclosures of the aforementioned applications are hereby incorporated by reference in their entireties.

TECHNICAL FIELD

This application relates to the technical field of circuits, and in particular, to an electronic device, a pull-up circuit, and a method for suppressing a POP sound of an earphone.

BACKGROUND

An electronic device, such as a mobile phone and a notebook computer, has gradually popularized an application of a universal serial bus (universal serial bus Type-C, USB Type-C) interface (hereinafter referred to as a Type-C interface). Considering factors such as dustproof, waterproof, and convenience, a 3.5 mm earphone plug has been gradually canceled for the electronic device, and an earphone (such as an analog earphone) needs to be connected to the electronic device through the Type-C interface.

the earphone may be normally or reversely inserted as being inserted into the Type-C interface of the electronic device through the Type-C plug. When the earphone is reversely inserted into the Type-C interface of the electronic device through the Type-C plug, current flow to left and right channels of the earphone respectively, which causes the earphone to produce a POP sound (this type of sound is expressed as a "puff" sound, therefore the sound is called a POP sound).

In theory, the left and right channels of the earphone may be disconnected to eliminate the POP sound of the earphone before the earphone is inserted into the Type-C interface of the electronic device through the Type-C plug. However, in the solution, a problem that the electronic device cannot normally recognize a normal/reverse insertion of the Type-C plug of the earphone exists, which further affects functions of the earphone. For example, only a background sound can be heard but a human voice cannot be heard, and a button is abnormal.

SUMMARY

An objective of this application is to provide an electronic device, a pull-up circuit, and a method for suppressing a POP sound of an earphone, which can normally identify normal/reverse insertion of the earphone while eliminating the POP sound when the earphone is reversely inserted.

To achieve the foregoing objective, the following technical solutions are used in this application.

According to a first aspect, this application provides an electronic device. The electronic device includes a controller, a pull-up circuit, and a Type-C interface. An output terminal of the pull-up circuit is configured to be connected to a Type-C plug of the earphone through a MIC pin of the Type-C interface. The controller is configured to control the electronic device to be disconnected from an audio path of the earphone when the earphone is inserted into the Type-C interface of the electronic device through the Type-C plug. In this way, when the earphone is reversely inserted into the electronic device through the Type-C plug, the POP sound of the earphone can be suppressed. In addition, the controller is configured to control an access resistance value of the pull-up circuit to be a first resistance value, and identify normal/reverse insertion of the earphone based on a voltage at the MIC pin of the Type-C interface. The controller is further configured to control the access resistance value of the pull-up circuit to be a second resistance value after the identification is completed and the second resistance value is less than the first resistance value.

It can be seen that the access resistance value of the pull-up circuit of the electronic device is controlled to be a different resistance value at a different stage. In the identification stage, the access resistance value of the pull-up circuit is controlled to be a higher first resistance value. After the electronic device increases the access resistance value of the pull-up circuit, the partial voltage of the pull-up circuit is relatively large, thereby reducing the voltage at the MIC pin of the Type-C interface. In this way, even when the earphone is reversely inserted into the electronic device through the Type-C plug, since the voltage at the MIC pin of the Type-C interface is lowered, and the reverse insertion identification threshold is a lower voltage range, the voltage at the MIC pin of the Type-C interface falls within the reverse insertion identification threshold, so that the reverse insertion of the earphone can be identified. After the identification is completed, the electronic device controls the access resistance value of the pull-up circuit to be the second resistance value (increase the previous resistance value), so that there is no need to change an original identification threshold and an identification logic, and the function of the original button is not affected.

In some possible implementations, an input terminal of the pull-up circuit includes a first input terminal and a second input terminal. The pull-up circuit increases a first impedance circuit and a second impedance circuit connected in series. The first input terminal is connected to the output terminal of the pull-up circuit through the first impedance circuit and the second impedance circuit connected in series, and the second input terminal is connected to the output terminal of the pull-up circuit through the second impedance circuit. The controller is configured to control turn-on of the first input terminal and turn-off of the second input terminal when the earphone is inserted into the Type-C interface of the electronic device through the Type-C plug. In this way, in the identification stage of the electronic device, the pull-up circuit is connected to the first impedance circuit and the second impedance circuit, and an access impedance of the pull-up circuit is improved, thereby reducing the voltage at the MIC pin of the Type-C interface. Then, after the identification is completed, the controller is configured to control turn-on of the second input terminal. In this way, the first input terminal and the second input terminal are at the same potential, an additional current flow is reduced, an additional power consumption is reduced, and a backfill problem of the power supply caused by only accessing the second input terminal can also be avoided.

In some other possible implementations, the pull-up circuit includes a bypass circuit and a first impedance circuit and a second impedance circuit connected in series. The bypass circuit and the first impedance circuit are connected in parallel between the input terminal of the pull-up circuit and the second impedance circuit. The controller is configured to control the bypass circuit to be disconnected when the earphone is inserted into the Type-C interface of the electronic device through the Type-C plug, so that both the first impedance circuit and the second impedance circuit of the pull-up circuit are connected, an access impedance of the pull-up circuit is improved, the voltage at the MIC pin of the Type-C interface is reduced. Then, after the identification is completed, the controller is configured to control turn-on of the bypass circuit. In this way, the first impedance circuit in the pull-up circuit is bypassed, so that the access resistance value of the pull-up circuit is restored to the second resistance value, and there is no need to change an original identification threshold and an identification logic, and the function of the original button is not affected.

In some possible implementations, the controller is further configured to control turn-on of the audio paths of the electronic device and the earphone after the identification is completed, so that a user can use the earphones to listen to music, answer a call, and the like.

In some possible implementations, the pull-up circuit further includes a first capacitor. A first end of the first impedance circuit is configured to be connected to the second impedance circuit, the first impedance circuit includes a first resistor, a first end of the first capacitor is connected to the first end of the first resistor, a second end of the first capacitor is grounded, and a second end of the first resistor is the first end of the first impedance circuit. After the first capacitor is connected, the first capacitor may be configured as a filter.

In some possible implementations, the first resistance value is in a range of 2640 ohms to 4000 ohms.

In some possible implementations, a resistance value of the first resistor is in a range of 880 ohms to 1320 ohms.

In some possible implementations, the first resistance value is 3300 ohms, and the resistance value of the first resistor is 1100 ohms.

According to a second aspect, this application provides a pull-up circuit. The pull-up circuit is applicable to an electronic device, where the electronic device further includes a controller and a Type-C interface.

An output terminal of the pull-up circuit is configured to be connected to a Type-C plug of an earphone through a microphone MIC pin of the Type-C interface.

The controller is configured to control the electronic device to be disconnected from an audio path of the earphone, control an access resistance value of the pull-up circuit to be a first resistance value, and identify normal/reverse insertion of the earphone based on a voltage of the MIC pin of the Type-C interface when the earphone is inserted into the Type-C interface of the electronic device through the Type-C plug.

The controller is configured to control the access resistance value of the pull-up circuit to be a second resistance value after the identification is completed, and the first resistance value is greater than the second resistance value.

In some possible implementations, an input terminal of the pull-up circuit includes a first input terminal and a second input terminal. The pull-up circuit includes a first impedance circuit and a second impedance circuit connected in series. The first input terminal is connected to the output terminal of the pull-up circuit through the first impedance circuit and the second impedance circuit connected in series, and the second input terminal is connected to the output terminal of the pull-up circuit through the second impedance circuit.

The controller is further configured to control turn-on of the first input terminal and turn-off of the second input terminal when the earphone is inserted into the Type-C interface of the electronic device through the Type-C plug.

The controller is further configured to control turn-on of the second input terminal after the identification is completed.

In some possible implementations, the pull-up circuit includes a bypass circuit and a first impedance circuit and a second impedance circuit connected in series. The bypass circuit and the first impedance circuit are connected in parallel between the input terminal of the pull-up circuit and the second impedance circuit.

The controller is further configured to control the bypass circuit to be disconnected when the earphone is inserted into the Type-C interface of the electronic device through the Type-C plug.

The controller is further configured to control turn-on of the bypass circuit after the identification is completed.

In some possible implementations, the pull-up circuit further includes a first capacitor. A first end of the first impedance circuit is configured to be connected to the second impedance circuit, the first impedance circuit includes a first resistor, a first end of the first capacitor is connected to the first end of the first impedance circuit, a second end of the first capacitor is grounded, and a second end of the first resistor is the first end of the first impedance circuit.

In some possible implementations, the first resistance value is in a range of 2640 ohms to 4000 ohms.

In some possible implementations, a resistance value of the first resistor is in a range of 880 ohms to 1320 ohms.

In some possible implementations, the first resistance value is 3300 ohms, and the resistance value of the first resistor is 1100 ohms.

According to a third aspect, this application provides a method for suppressing a POP sound of an earphone. The method is applicable to an electronic device. The electronic device includes a controller, a pull-up circuit, and a Type-C interface. An output terminal of the pull-up circuit is configured to be connected to a Type-C plug of an earphone through a microphone MIC pin of the Type-C interface. The method includes:

- controlling, by the controller, the electronic device to be disconnected from an audio path of the earphone, controlling an access resistance value of the pull-up circuit to be a first resistance value, and identifying normal/reverse insertion of the earphone based on a voltage of the MIC pin of the Type-C interface when the earphone is inserted into the Type-C interface of the electronic device through the Type-C plug; and
- controlling, by the controller, the access resistance value of the pull-up circuit to be a second resistance value after the identification is completed, where the first resistance value is greater than the second resistance value.

In some possible implementations, after completion of the identification, the method further includes: controlling, by the controller, turn-on of the audio path.

The technical solutions of this application have the following beneficial effects.

The access resistance value of the pull-up circuit of the electronic device is controlled to be a different resistance value at a different stage. In the identification stage, for example, when the earphone is inserted into the Type-C interface of the electronic device through the Type-C plug, the electronic device is controlled to disconnect from an audio path of the earphone, and the access resistance value of the pull-up circuit is controlled to be a higher first resistance value. After the electronic device increases the access resistance value of the pull-up circuit, the partial voltage of the pull-up circuit is relatively large, thereby reducing the voltage at the MIC pin of the Type-C interface. In this way, even when the earphone is reversely inserted into the electronic device through the Type-C plug, since the voltage at the MIC pin of the Type-C interface is lowered, and the reverse insertion identification threshold is a lower voltage range, the voltage at the MIC pin of the Type-C interface falls within the reverse insertion identification threshold, so that the reverse insertion of the earphone can be identified. In addition, the audio path between the electronic device and the earphone is disconnected, and the POP sound of the earphone can be suppressed. After the identification is completed, the electronic device controls the access resistance value of the pull-up circuit to be the second resistance value (increase the previous resistance value), so that there is no need to change an original identification threshold and an identification logic, and the function of the original button is not affected.

It should be understood that descriptions of technical features, technical solutions, beneficial effects, or similar languages in this application do not imply that all features and advantages can be achieved in any single embodiment. On the contrary, it may be understood that descriptions of features or beneficial effects mean that a particular technical feature, technical solution, or beneficial effect is included in at least one embodiment. Therefore, descriptions of the technical features, technical solutions, or beneficial effects in this specification do not necessarily refer to a same embodiment. Further, the technical features, technical solutions, and beneficial effects described in the embodiments may be combined in any suitable manner. A person skilled in the art understands that the embodiments can be implemented without one or more particular technical features, technical solutions, or beneficial effects of a particular embodiment. In other embodiments additional technical features and beneficial effects may be further identified in a particular embodiment that does not embody all embodiments.

DESCRIPTION OF EMBODIMENTS

In the specification, claims, and accompanying drawings of this application, the terms "first", "second", "third", and the like are intended to distinguish between different objects but do not indicate a particular order.

In the embodiments of this application, the terms "exemplary" or "for example" are used for giving an example, an illustration, or a description. Any embodiment or design solution described as an "exemplary" or "for example" in the embodiments of this application should not be explained as being more preferred or having more advantages than other embodiments or design solutions. In particular, the terms such as "exemplary" and "example" as used herein are intended to present the related concept in a specific implementation.

To facilitate understanding of technical solutions of this application, application scenarios of the embodiments of this application are described below.

Figure 1:
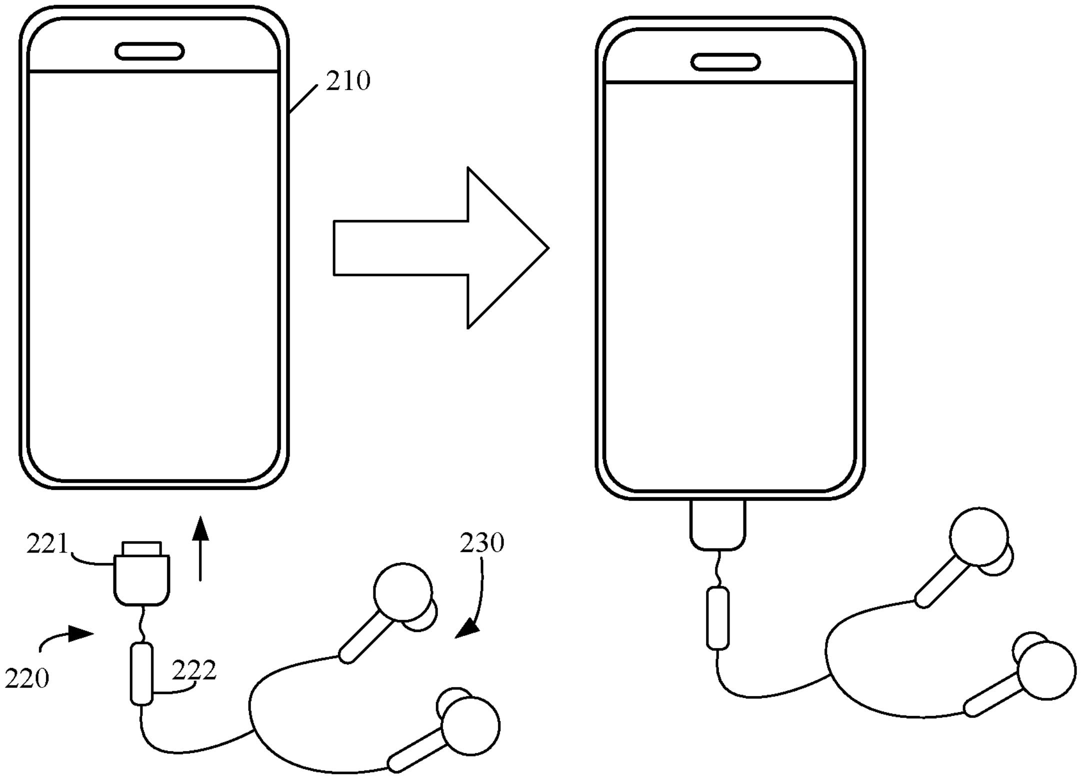
FIG. 1 is a schematic diagram of an application scenario according to an embodiment of this application.

FIG. 1 is a schematic diagram of an application scenario according to an embodiment of this application. In this application scenario, the electronic device 210 includes a Type-C interface 211. The electronic device 210 may be a device such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a smart watch. Specific forms of the above electronic device 200 are not specially limited in this application. For ease of understanding, the following takes the electronic device 210 as the mobile phone for example to introduce.

The earphone 230 is an analog earphone. The analog earphone may be understood as an earphone without a Type-C plug, or as a usual cylindrical plug 3.5 mm earphone. The analog earphone needs to be connected to the Type-C interface 211 of the mobile phone by using an adapter cable 220. One end of the adapter cable 220 supports a cylindrical plug 222 inserted into the analog earphone, and another end is a Type-C plug. The Type-C plug can be inserted into the Type-C interface of the mobile phone. The analog earphone can be connected to the mobile phone through the adapter cable 220.

Figure 2:
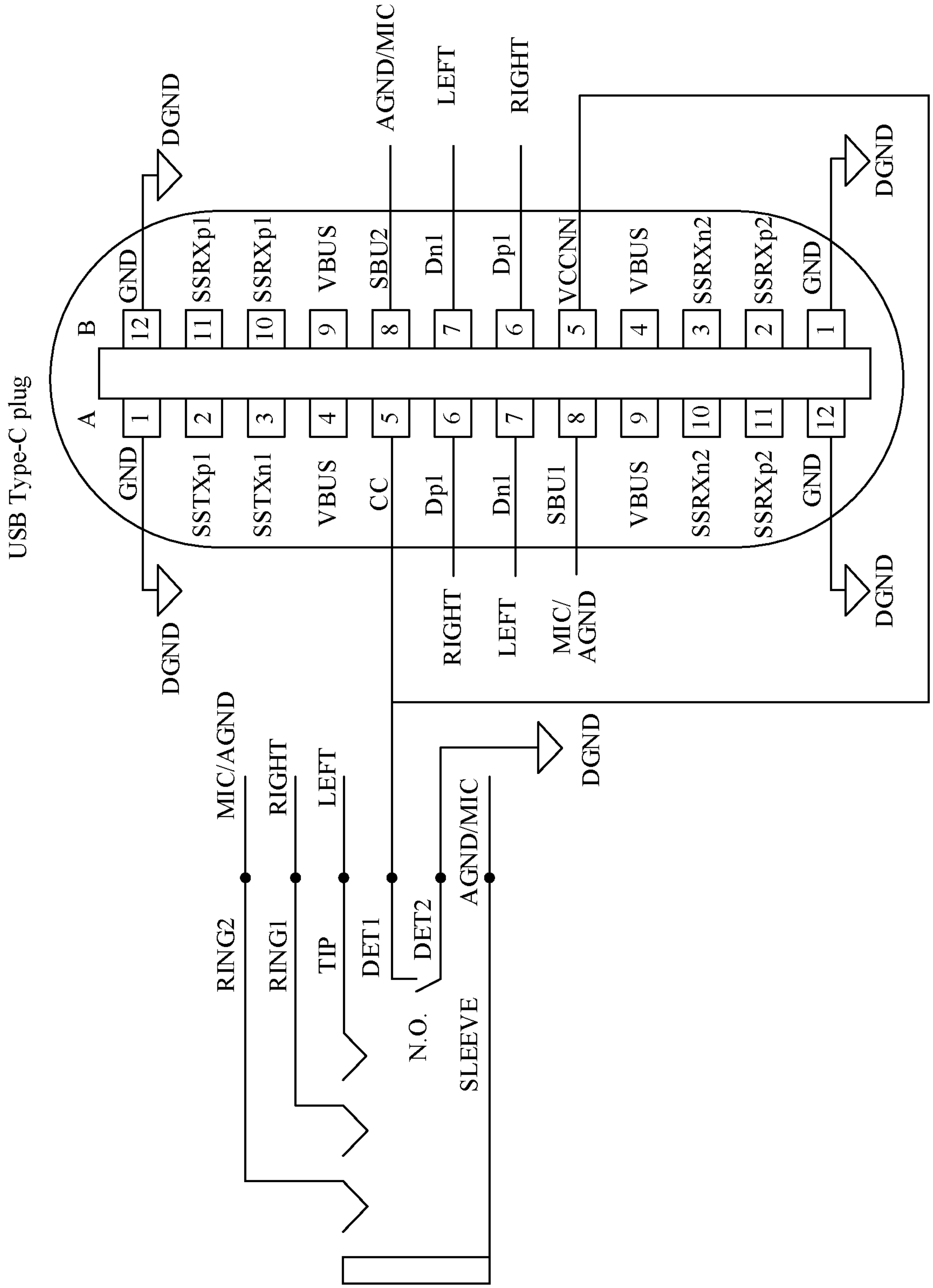
FIG. 2 is a schematic diagram of a Type-C plug according to an embodiment of this application.

FIG. 2 is a schematic diagram of a Type-C plug according to an embodiment of this application. The 3.5 mm earphones may include four pins, which are a RING2, a RING1, a TIP, and a SLEEVE. The functions of each pin are described below.

The pin RING2 is configured to implement a microphone function or configured to be grounded.

The pin RING1 is configured to implement a right channel.

The pin TIP is configured to implement a left channel.

The pin SLEEVE is configured to implement a microphone function or configured to be grounded. When the pin RING2 is configured to implement the microphone function, the pin SLEEVE is configured to be grounded; and when the pin RING2 is configured to be grounded, the pin SLEEVE is configured to implement the microphone function.

The Type-C plug includes 24 pins, which are A1 to A12 and B1 to B12. A1 to A12 are functionally similar to B1 to B12. The following takes the pins A1 to A12 as an example to illustrate the functions of each pin.

The pin A1 and the pin A12 are ground pins, which are also referred to as GND pins.

The pin A2 and the pin A3 are data transmission pins, which are also referred to as TX1+pins and TX1 pins, and are configured to be compatible with USB3.0 and USB3.1.

The pin A4 and the pin A9 are connected to a power supply module in a terminal device, so that the terminal device is powered by the Type-C interface. That is to say, the terminal device provides a VBUS for the Type-C interface, which is also referred to as a VBUS pin.

The pin A5 is an external device detection pin, which is also known as a CC1 pin, and is configured to detect a type of external device. The type of external device may include a downstream facing port (downstream facing port, DFP) device and an upstream facing port (upstream facing port, UFP) device. In an embodiment, the DFP device may be referred to as a master device, and the UFP device may be referred to as a slave device. The DFP device can be configured to provide the VBUS and/or provide data, and the UFP device can be configured to take power from the DFP device and/or provide data. For example, a power adapter can be regarded as the DFP device, and a U disk and a mobile hard disk can be regarded as the UFP device. In this embodiment, after a signal of the CC pin is pulled down, D+ and D− signals are triggered to switch to an audio path, and then a controller on the mobile phone performs an earphone type identification, including but not limited to a normal/reverse insertion identification, a three-segment earphone identification, and a four-segment earphone identification.

The pin A6 and the pin A7 are data transmission pins, which are also referred to as D+ pin and D− pin, and are configured to transmit an audio and video stream or a file. The pin A6 and the pin A7 are configured to be compatible with USB2.0.

The pin A8 is a function extension pin, which is also referred to as a SBU1 pin.

The pin A10 and the pin A11 are data receiving pins, which are also referred to as RX2+ pins and RX2 pins, and are configured to be compatible with USB3.0 and USB3.1.

The functions of B1 to B12 correspond to A1 to A12, which are not be repeated here. B1 to B12 may be referred to as GND, TX2+, TX2−, VBUS, CC2, D+, D−, SBU2, VBUS, RX1+, RX1−, and GND.

Figure 3A:
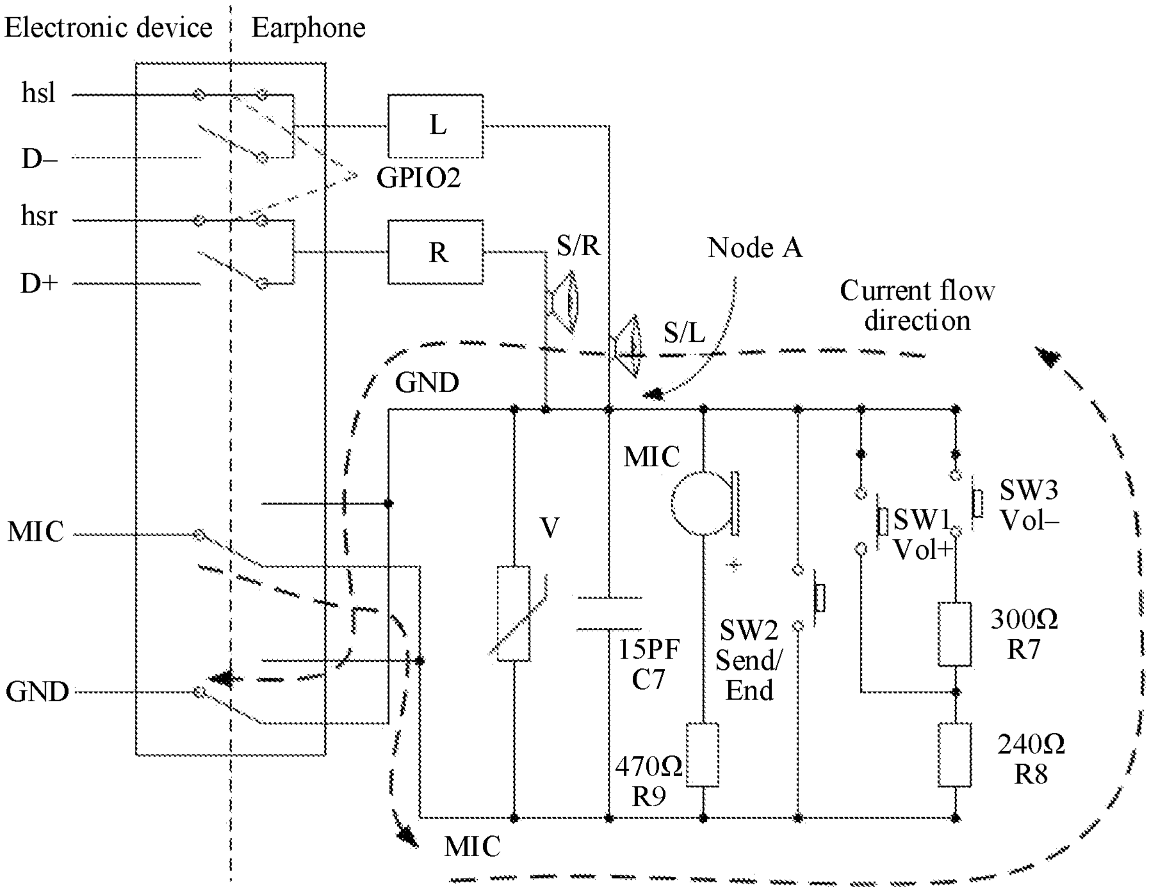
FIG. 3A is a schematic diagram of a current flow direction during normal insertion according to an embodiment of this application.

As can be seen from FIG. 2, the Type-C plug presents a symmetrical shape. When the analog earphone is inserted into the Type-C interface of the mobile phone through the Type-C plug of the adapter cable 220, the earphone may be normally or reversely inserted. The MIC and the GND of the analog earphone may be implemented through SBU1 and SBU2. For example, when the analog earphone is normally inserted into the Type-C interface through the Type-C plug, the MIC is implemented through SBU1, and the GND is implemented through SBU2; and when the analog earphone is reversely inserted into the Type-C interface through the Type-C plug, the MIC is implemented through SBU2, and the GND is implemented through SBU1. When the mobile phone determines that the analog earphone is reversely inserted, the MIC needs to be switched from being implemented by SBU1 to being implemented by SBU2 and the GND is witched from being implemented by SBU2 to being implemented by SBU1. Therefore, the normal/reverse insertion of the analog earphone is necessarily to be identified. Generally, the mobile phone identifies the normal/reverse insertion of the earphone based on the voltage at the MIC pin of the Type-C interface, which is introduced in combination with the accompanying drawings below:

FIG. 3A is a schematic diagram of a current flow direction during normal insertion according to an embodiment of this application. When the analog earphone is inserted into the Type-C interface of the mobile phone through the Type-C plug of the adapter cable 220, the MIC (such as SBU1) pin of the Type-C interface of the mobile phone is connected to the MIC (such as SBU1) pin of the Type-C plug of the adapter cable, and the GND (such as SBU2) pin of the Type-C interface of the mobile phone is connected to the GND (such as SBU2) pin of the Type-C plug of the adapter cable. The mobile phone provides power to SBU1 pin to identify the normal/reverse insertion of the analog earphone. Specifically, the mobile phone can identify the normal/reverse insertion of the analog earphone by detecting the voltage at SBU1 pin. For example, when the voltage at SBU1 pin detected by the mobile phone falls into a normal insertion identification threshold, the analog earphone is identified as the normal insertion; and when the voltage at SBU1 pin detected by the mobile phone falls into a reverse insertion identification threshold, the analog earphone is identified as the reverse insertion.

Still referring to FIG. 3A, after the mobile phone provides power to SBU1 pin of the Type-C interface, the current is passed by the MIC (such as SBU1) pin of the Type-C interface of the mobile phone through the MIC (such as SBU1) pin of the Type-C plug of the adapter cable, then through an amplifier circuit inside the analog earphone, and then flows back to the GND (such as SBU2) pin of the Type-C interface of the mobile phone through the GND (such as SBU2) pin of the Type-C plug of the adapter cable. The current flows directly back into the mobile phone from a node A, and the current does not be sunk into the audio paths of the left and right channels of the analog earphone from the node A, so that the POP sound is not generated.

Figure 3B:
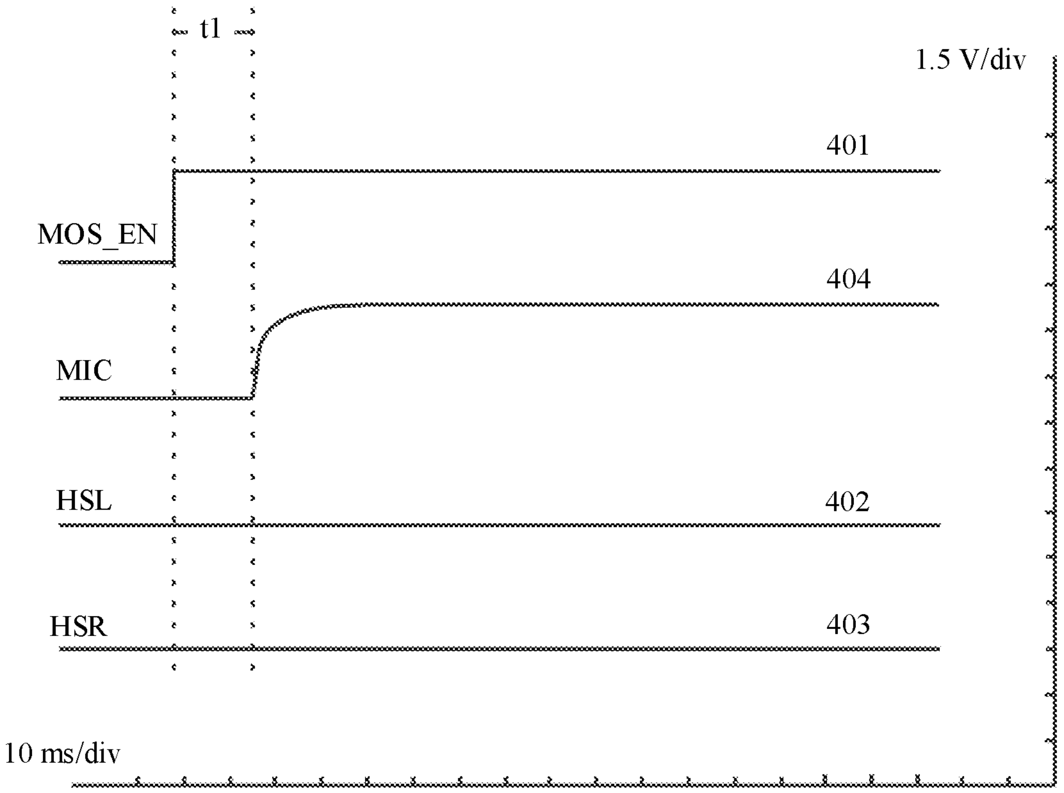
FIG. 3B is a schematic diagram of a voltage change curve according to an embodiment of this application.

FIG. 3B is a schematic diagram of a voltage change curve according to an embodiment of this application. The horizontal coordinate is the time, each div (div) represents 10 ms, and the vertical coordinate is the voltage, each div (div) represents 1.5 V. 401 represents a voltage change curve of the MIC of the analog earphone. 402 and 403 represent the voltage change curve at an audio path terminal of the left and right channels of the analog earphone, respectively. For example, 402 is the voltage change curve of the hsl (such as D-multiplexing) pin of the Type-C interface of the mobile phone, and 404 is the voltage change curve of the MIC (SBU1) pin of the Type-C interface of the mobile phone.

Figure 4A:
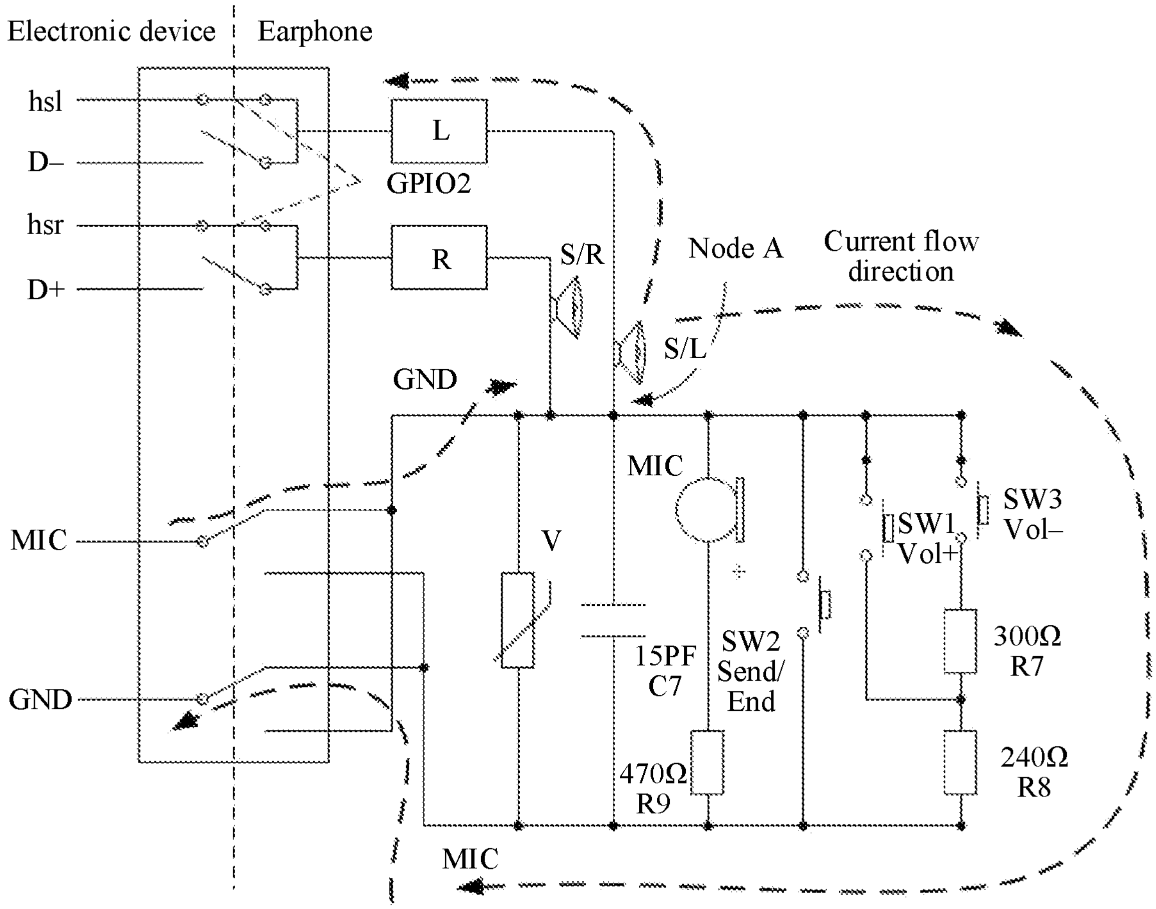
FIG. 4A is a schematic diagram of a current flow direction during reverse insertion according to an embodiment of this application.

FIG. 4A is a schematic diagram of a current flow direction during reverse insertion according to an embodiment of this application. When the analog earphone is inserted into the Type-C interface of the mobile phone through the Type-C plug of the adapter cable 220, the MIC (such as SBU1) pin of the Type-C interface of the mobile phone is connected to the GND (such as SBU2) pin of the Type-C plug of the adapter cable, and the GND (such as SBU2) pin of the Type-C interface of the mobile phone is connected to the MIC (such as SBU1) pin of the Type-C plug of the adapter cable. The mobile phone provides power to SBU1 pin to identify the normal/reverse insertion of the analog earphone. Specifically, the mobile phone can identify the normal/reverse insertion of the analog earphone by detecting the voltage at SBU1 pin. For example, when the voltage at SBU1 pin detected by the mobile phone falls into a normal insertion identification threshold, the analog earphone is identified as the normal insertion; and when the voltage at SBU1 pin detected by the mobile phone falls into a reverse insertion identification threshold, the analog earphone is identified as the reverse insertion.

Still referring to FIG. 4A, after the mobile phone provides power to SBU1 pin of the Type-C interface, and the current is passed by the MIC (such as SBU1) pin of the Type-C interface of the mobile phone through the GND (such as SBU2) pin of the Type-C plug of the adapter cable, the current is divided into two channels. One channel of current is directly sunk into the audio paths of the left and right channels of the analog earphone from the node A, which generates the POP sound; and the other channel of current is passed by the node A through the amplifier circuit inside the analog earphone, and then flows back to the GND (such as SBU2) pin of the Type-C interface of the mobile phone through the MIC (such as SBU1) pin of the Type-C plug of the adapter cable.

Figure 4B:
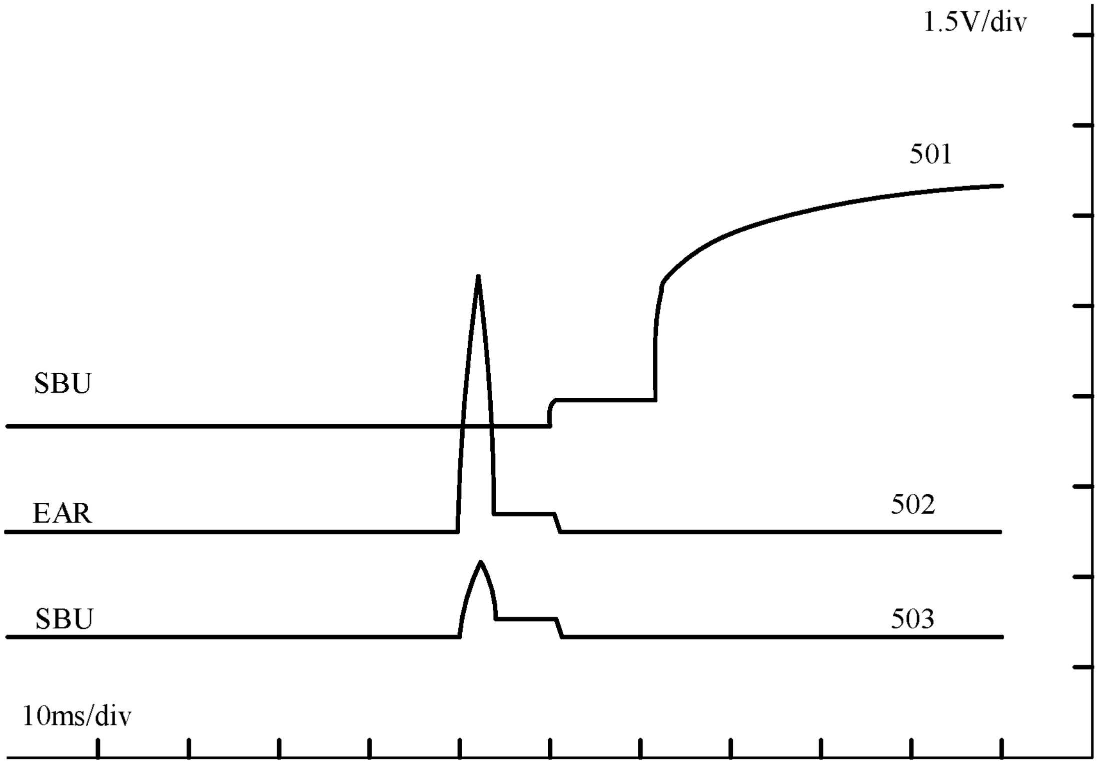
FIG. 4B is a schematic diagram of a voltage change curve according to an embodiment of this application.

FIG. 4B is a schematic diagram of a voltage change curve according to an embodiment of this application. The horizontal coordinate is the time, each div (div) represents 10 ms, and the vertical coordinate is the voltage, each div (div) represents 1.5 V. 501 represents a voltage change curve of the GND (SBU2) pin of the Type-C interface of the mobile phone. 502 represents a change curve of the voltage of the audio path terminal of the analog earphone, for example, the change curve of the voltage of the hsl (such as D-multiplexing) pin of the Type-C interface of the mobile phone. 503 represents a voltage change curve of the MIC (SBU1) pin of the Type-C interface of the mobile phone.

It should be noted that the voltage of SBU2 pin of the Type-C interface of the mobile phone becomes high (such as the curve 501) and the voltage of SBU1 pin of the Type-C interface of the mobile phone becomes low (such as the curve 503) are caused by the mobile phone switches the MIC by SBU2 pin and the GND by SBU1 pin when it is determined that the earphone is reversely inserted.

As can be seen from FIG. 3A and FIG. 3B, during the connection process between the analog earphone and the mobile phone through the adapter cable, if the analog earphone is normally inserted, the current is not sunk into audio paths of the left and right channels of the analog earphone, and the POP sound is not generated; and if the analog earphone is reversely inserted, the current is not sunk into the audio paths of the left and right channels of the analog earphone, and the POP sound is not generated.

The impedance inside the analog earphone is different when being normally inserted and reversely inserted. When the analog earphone and the mobile phone are normally inserted, the amplifier circuit of the MIC inside the analog earphone (such as a field effect transistor) operates in a constant current region (also referred to as an amplification region), and an equivalent impedance is generally about 2000Ω. If the impedance is large, the voltage at the MIC pin of the Type-C interface detected by the mobile phone is relatively high and falls within the normal insertion identification threshold (such as 900 mV to 2650 mV). On the contrary, when the analog earphone is reversely inserted into the mobile phone, since the audio paths of the left and right channels of the analog earphone is connected in parallel with a discharge circuit inside the earphone, the impedance of the audio path is small, which lowers the overall impedance. As a result, the voltage at the MIC pin of the Type-C interface detected by the mobile phone is relatively low; falling within the reverse insertion identification threshold (such as 9 mV to 899 mV).

It should be noted that the normal insertion identification threshold and the reverse insertion identification threshold are obtained by testing a plurality of earphones (including but not limited to ordinary earphones, high-impedance earphones, and the like) in advance. For example, when the plurality of earphones are normally inserted, the voltage at the MIC pin of the Type-C interface is detected to obtain the normal insertion identification threshold; and similarly, when the plurality of earphones are reversely inserted, the voltage at the MIC pin of the Type-C interface is detected to obtain the reverse insertion identification threshold.

Figure 5:
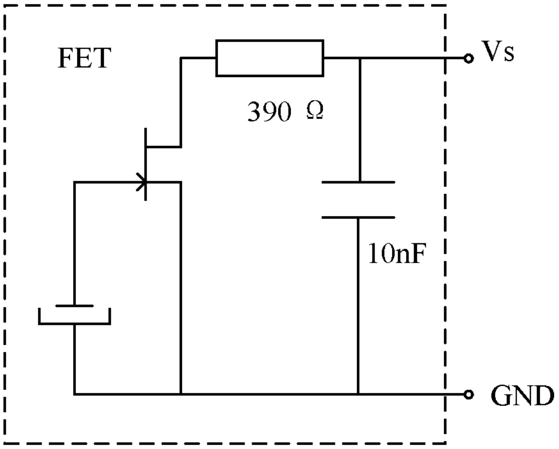
FIG. 5 is an internal circuit diagram of a MIC according to an embodiment of this application.

It should be noted that, generally, most of the analog earphones are an electret MIC. A permanent charge electret material exists in the electret MIC, which does not need to power the capacitor, but a pre-amplifier of the circuit needs to be powered. The electret film is a very thin Teflon film. After high-voltage polarization treatment, the Teflon film can retain a certain amount of negative charge on the film for a long time, that is, the capacitance Q is constant. When the two poles of the capacitance change, Q=CU, and U changes to realize an acoustic-electric conversion. The capacitance between the electret film and the metal plate is relatively small, which is generally tens of pf, therefore the output impedance is very high and is about tens of megabytes or more. As a result, the electret film cannot be directly connected to the input amplifier, and an impedance converter needs to be connected. Generally, a field effect transistor and a diode are usually used to form the impedance converter. FIG. 5 is an internal circuit diagram of a MIC according to an embodiment of this application.

In order to eliminate the POP sound generated when the analog earphone is reversely inserted, the audio path of the left and right channels of the mobile phone and the analog earphone can be disconnected first, such as disconnecting a switch GPIO2 in FIG. 4A. In this way, when the analog earphone is reversely inserted into the mobile phone, the current is not sunk into the left and right channels of the earphone, and the POP sound is not generated. However, when the analog earphone is disconnected from the audio paths of the left and right channels of the mobile phone, and the analog earphone is reversely inserted into the mobile phone, the amplifier circuit inside the analog earphone operates in a variable resistance region. Although the equivalent impedance of the amplifier circuit operating in the variable resistance region is less than the equivalent impedance of the amplifier circuit operating in the constant current region, the voltage at the MIC pin of the Type-C interface is not sufficient to be pulled down to the reverse insertion identification threshold. That is to say, when the analog earphone is reversely inserted into the mobile phone, the voltage still falls within the normal insertion identification threshold, and is mistakenly identified as being normally inserted, which affects the function of the earphone, such as only hearing a background sound but not a human voice, an abnormal button.

Based on the above, an embodiment of this application provides an electronic device (such as a mobile phone). While disconnecting audio paths of the left and right channels of the mobile phone and the analog earphone, the normal/reverse insertion identification of the analog earphone is completed by changing the resistance value of the pull-up circuit at different stages, and there is no influence on the subsequent buttons. In the identification stage, the mobile phone increases the resistance of the pull-up circuit, and reduces the voltage at the MIC pin of the Type-C interface by increasing the voltage across the pull-up circuit, thereby ensuring that the voltage at the MIC pin of the Type-C interface still falls within the reverse insertion identification threshold when the analog earphone is reversely inserted. After the identification is completed, the mobile phone reduces the resistance value of the pull-up circuit (such as restoring to the resistance value before the increase), so that there is no need to change an original identification threshold and an identification logic, and the function of the original button is not affected.

Figure 6:
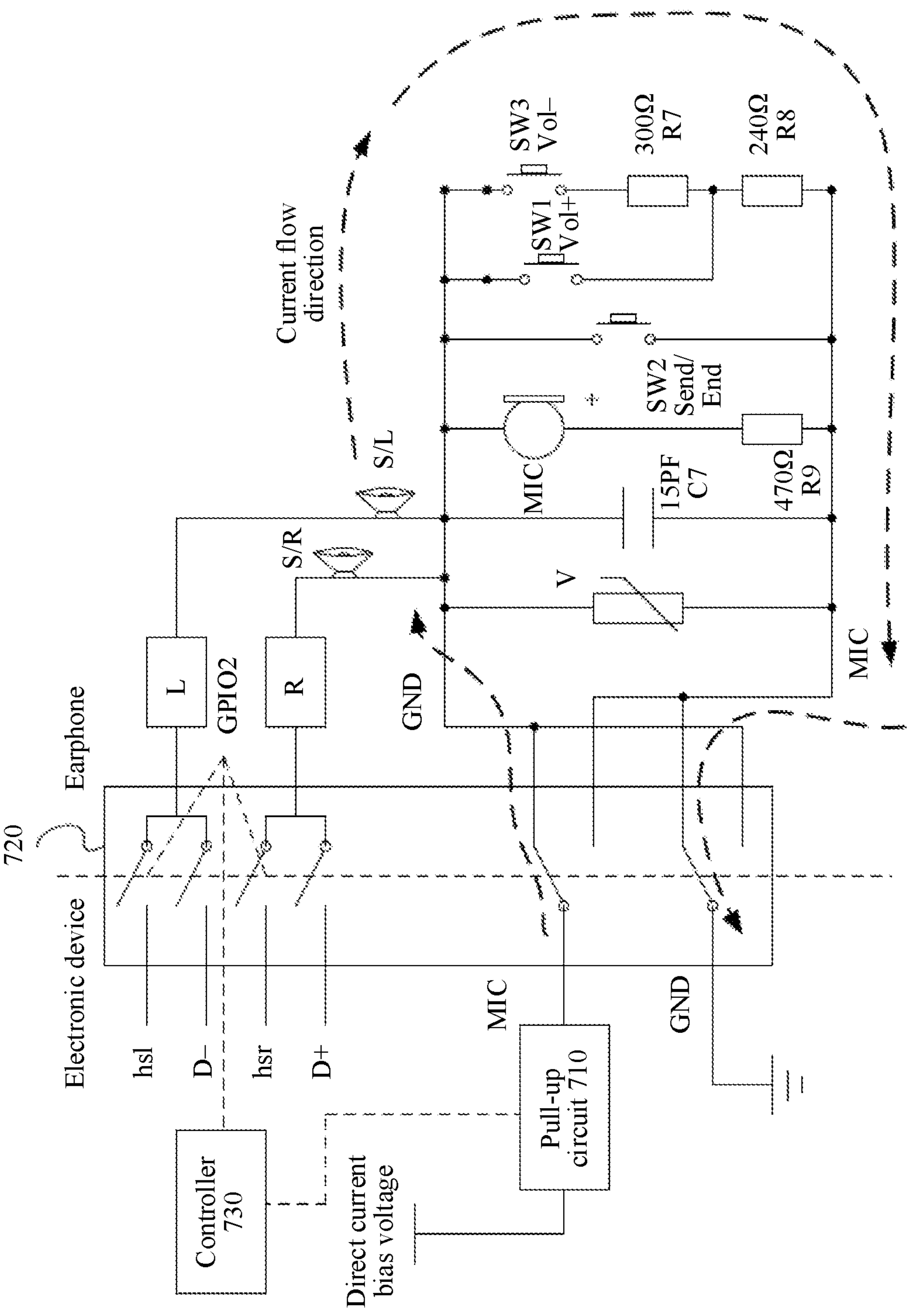
FIG. 6 is a schematic circuit diagram of an electronic device and an analog earphone being reversely inserted according to an embodiment of this application.

FIG. 6 is a schematic circuit diagram of an electronic device and an analog earphone being reversely inserted according to an embodiment of this application.

For ease of understanding, the following takes the electronic device as the mobile phone for example to introduce. The mobile phone includes a controller 730, a pull-up circuit 710, and a Type-C interface 720. An input terminal of the pull-up circuit 710 is connected to a direct current bias voltage, and an output terminal of the pull-up circuit 710 is connected to a MIC pin of the mobile phone. An output terminal of the pull-up circuit 710 is configured to be connected to the Type-C plug of the earphone (such as the analog earphone) through the Type-C interface. The audio path between the phone and the analog earphone is disconnected.

The analog earphone includes a MIC, left and right channel speakers (such as S/L and S/R), and a plurality of buttons (such as a hook button SW2, a volume up button SW1, and a volume down button SW3). Each button can be implemented by a switch. The analog earphone further includes a transient voltage suppression diode V, a capacitor C7, a resistor R7, a resistor R8, and a resistor R9. A first end of the transient voltage suppression diode V is connected to a first end of the capacitor C7, and a second end of the transient voltage suppression diode V is connected to a second end of the capacitor C7. A first end of the MIC is connected to a first end of the capacitor C7, a second end of the MIC is connected to a first end of the resistor R9, and a second end of the resistor R9 is connected to a second end of the capacitor C7. A first end of the hook button SW2 is connected to a first end of the MIC, and a second end of the hook button SW2 is connected to a second end of the resistor R9. A first end of the volume down button SW3 is connected to a first end of the hook button SW2, a second end of the volume down button SW3 is connected to a first end of the resistor R7, a second end of the resistor R7 is connected to a first end of the resistor R8, and a second end of the resistor R8 is connected to a second end of the hook button SW2. A first end of the volume up button SW1 is connected to a first end of the hook button, and a second end of the volume up button SW1 is connected to a second end of the electron R7.

It should be noted that the internal circuit of the analog earphone is only an example.

Next, when the analog earphone is inserted into the Type-C interface of the mobile phone through the Type-C plug of the adapter cable, the controller on the mobile phone controls an access resistance value of the pull-up circuit to be the first resistance value, and then identifies the normal/reverse insertion of the analog earphone based on the voltage at the MIC pin of the Type-C interface. The controller is configured to control the access resistance value of the pull-up circuit to be a second resistance value after the identification is completed, and the first resistance value is greater than the second resistance value.

That is to say, the equivalent impedance of the pull-up circuit of the mobile phone is large in the identification stage. Therefore, a partial voltage on the pull-up circuit is large, and the partial voltage at the MIC pin of the Type-C interface is small, which can reduce the partial voltage at the MIC pin of the Type-C interface. Therefore, when the analog earphone is inserted into the Type-C interface of the mobile phone through the Type-C plug of the adapter cable, the partial voltage at the MIC pin of the Type-C interface can be made to fall into the reverse insertion identification threshold, and the normal/reverse insertion of the analog earphone can be recognized normally even if the audio path of the mobile phone and the analog earphone is disconnected. In addition, after completing the identification, the mobile phone restores the equivalent impedance of the pull-up circuit to the original equivalent impedance, which does not affect an original identification threshold and an identification logic. It can be learned that the mobile phone can also identify the normal/reverse insertion of the analog earphone normally while eliminating the POP sound when the analog earphone is reversely inserted.

The specific form of the pull-up circuit is not limited in the embodiments of this application, and is described below by two different examples.

Figure 7A:
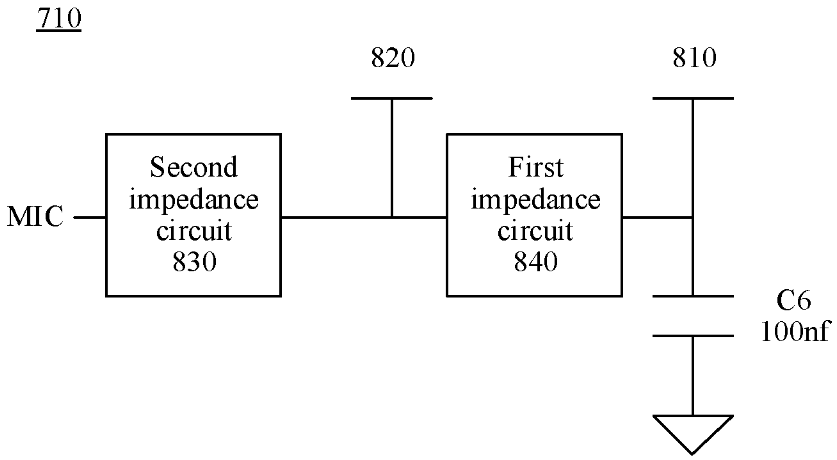
FIG. 7A is a schematic diagram of a pull-up circuit according to an embodiment of this application.

In some embodiments, FIG. 7A is a schematic diagram of a pull-up circuit according to an embodiment of this application. The input terminal of the pull-up circuit 710 includes a first input terminal 810 and a second input terminal 820. The pull-up circuit includes a first impedance circuit 840 and a second impedance circuit 830 connected in series. A resistance value of the first impedance circuit 840 and the second impedance circuit 830 in series is a first resistance value, and a resistance value of the second impedance circuit 830 is a second resistance value. Further, the pull-up circuit 710 may further include a first capacitor C6. A first end of the first capacitor C6 is connected to the first impedance circuit 840, and a second end of the first capacitor C6 is grounded. The equivalent impedance of the second impedance circuit 830 may be an equivalent impedance of the pull-up circuit on the mobile phone in a conventional design. In this example, the first impedance circuit 840 and the first capacitor C6 and the first input terminal 810 are added relative to the conventional design. The first input terminal 810 is connected to the output terminal of the pull-up circuit 710 through the first impedance circuit 840 and the second impedance circuit 830 connected in series, and the second input terminal 820 is connected to the output terminal of the pull-up circuit 710 through the second impedance circuit 830.

In the identification stage, the controller 730 is configured to control the first input terminal 810 to turn off the second input terminal 820 when the analog earphone is inserted into the Type-C interface of the mobile phone through the Type-C plug. That is to say, in the identification stage, an access part of the pull-up circuit includes the first impedance circuit 840 and the second impedance circuit 830, thereby increasing the partial voltage of the pull-up circuit and reducing the partial voltage at the MIC pin of the Type-C interface, so that the circuit can be normally identified as a reverse insertion or a normal insertion. The voltage provided by the first input terminal 810 and the voltage provided by the second input terminal 820 may be the same.

In some examples, when the obtained identification result is the reverse insertion, the controller 730 switches the MIC from being implemented by SBU1 to being implemented by SBU2 and switches the GND from being implemented by SBU2 to being implemented by SBU1, which is switching of a MIC signal and a GND signal.

After the identification is completed, the controller 730 is configured to control the second input terminal 820 to be turned on, thereby bypassing the increased first impedance circuit 840. That is to say, after completing the identification, the access part of the pull-up circuit includes the second impedance circuit 830, but does not include the increased first impedance circuit 840. Therefore, the original identification threshold and the identification logic are not affected, and the subsequent use of the analog earphone is not affected. When both the first input terminal 810 and the second input terminal 820 are turned on, the first input terminal 810 and the second input terminal 820 are at the same potential, which can reduce an additional current flow; reduce an additional loss generated by the circuit, and further prevent the power supply backflow when only the second input terminal 820 is turned on (the first input terminal 810 is turned off).

Figure 7B:
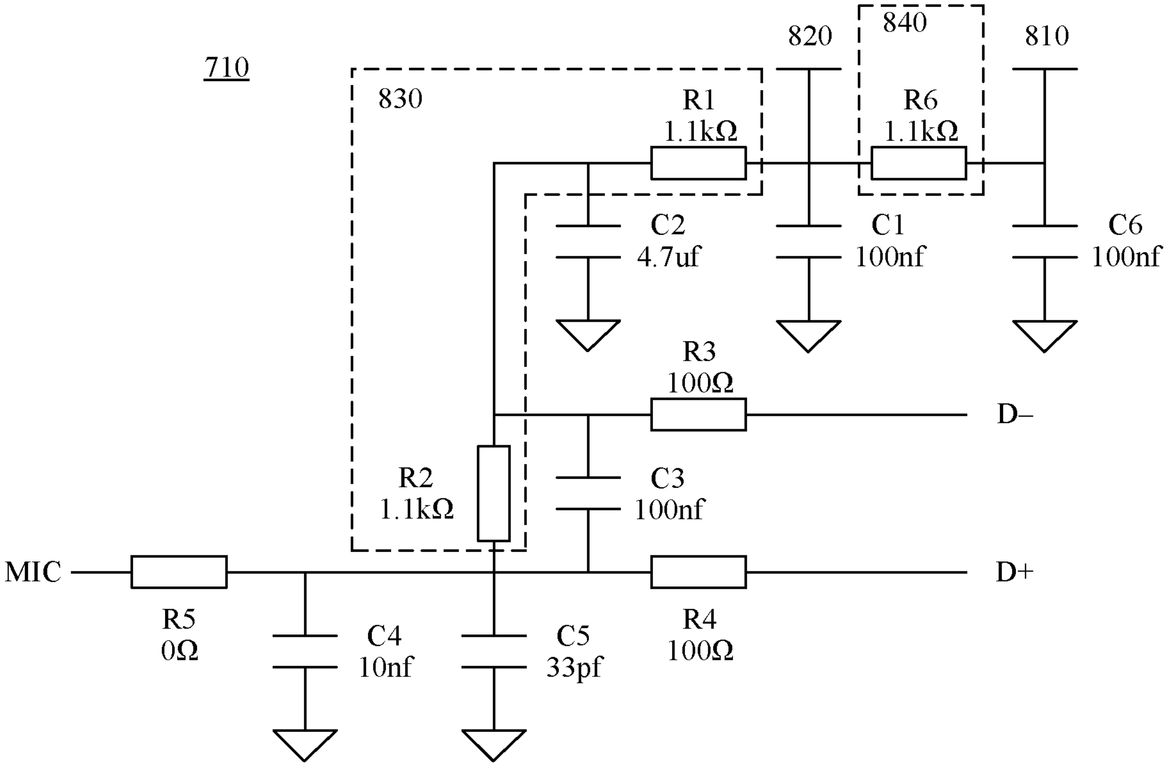
FIG. 7B is a schematic diagram of a pull-up circuit according to another embodiment of this application.

FIG. 7B is a schematic diagram of a pull-up circuit according to an embodiment of this application. The first impedance circuit may specifically include a first resistor R6. The second impedance circuit 830 may specifically include a second resistor R1 and a third resistor R2. The second resistor R1 and the third resistor R2 are connected in series. Further, the pull-up circuit 710 may further include a second capacitor C1 and a third capacitor C2. A first end of the second capacitor C1 is connected to a first end of the second resistor R1, and a second end of the second capacitor C1 is grounded. A first end of the third capacitor C2 is connected to a first end of the third resistor R2, and a second end of the third capacitor C2 is grounded. A first end of the second resistor R1 is connected to a second input terminal 820, a second end of the second resistor R1 is connected to a first end of the third resistor R2, and a second end of the third resistor R2 is configured to be connected to an output terminal of the pull-up circuit 710.

Further, the pull-up circuit may further include a fourth resistor R3, a fifth resistor R4, a sixth resistor R5, a fourth capacitor C3, a fifth capacitor C4, and a sixth capacitor C5. A first end of the fourth resistor R3 is connected to a first end of the third resistor R2, and a second end of the fourth resistor R3 is configured to be connected to a D-pin of the Type-C interface. A first end of the fifth resistor R4 is connected to a second end of the third resistor R2, and a second end of the fifth resistor R4 is configured to be connected to a D+ pin of the Type-C interface. A first end of the fourth capacitor C3 is connected to a first end of the fourth resistor R3, a second end of the fourth capacitor R3 is connected to a second end of the fifth resistor R4, a first end of the fifth capacitor C4 is connected to a first end of the fifth resistor R4, and a second end of the fifth capacitor C4 is grounded. A first end of the sixth resistor R5 is connected to a second end of the third resistor R2, a second end of the sixth resistor R5 is configured to be connected to an output terminal of the pull-up circuit, a first end of the sixth capacitor C5 is connected to a first end of the sixth resistor R5, and a second end of the sixth capacitor C5 is grounded.

Figure 8A:
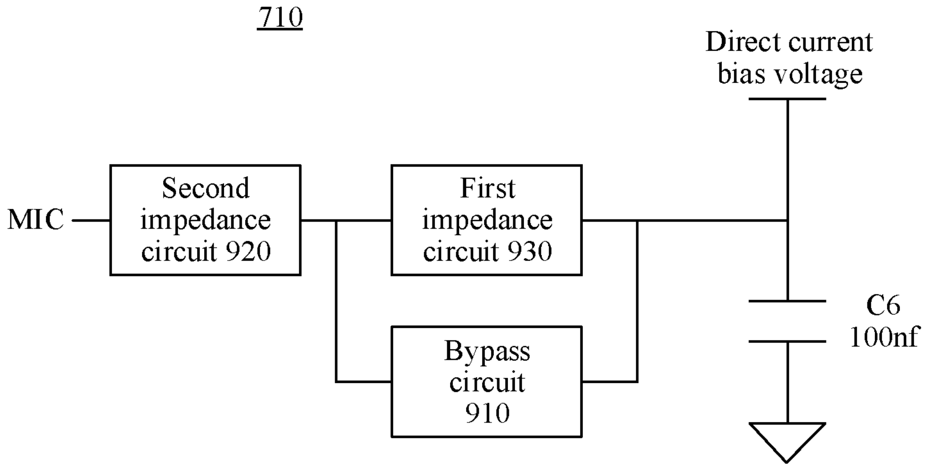
FIG. 8A is a schematic diagram of a pull-up circuit according to still another embodiment of this application.

In some other embodiments, FIG. 8A is a schematic diagram of a pull-up circuit according to an embodiment of this application. The pull-up circuit 710 further includes a bypass circuit 910. The pull-up circuit includes a first impedance circuit 930 and a second impedance circuit 920 in series. The resistance value of the first impedance circuit 930 and the second impedance circuit 920 in series is a first resistance value, and the resistance value of the second impedance circuit 920 is a second resistance value. The bypass circuit 910 is connected in parallel with the first impedance circuit 920 between the input terminal of the pull-up circuit 710 and the second impedance circuit 920. Further, the pull-up circuit 710 may further include a first capacitor C6. A first end of the first capacitor C6 is connected to a first end of the first impedance circuit 930, and a second end of the first capacitor C6 is grounded.

In the identification stage, the controller controls the bypass circuit 910 to disconnect when the analog earphone is inserted into the Type-C interface of the earphone through the Type-C plug, so as to improve the overall equivalent impedance of the pull-up circuit. Further, the partial voltage of the pull-up circuit 710 is large, which reduces the partial voltage at the MIC pin of the Type-C interface, so that the pull-up circuit can be normally identified as the reverse insertion or the normal insertion. Similarly, when the obtained identification result is the reverse insertion, the controller 730 switches the MIC signal and the GND signal.

After completing the identification, the controller controls the bypass circuit 910 to turn on to bypass the first impedance circuit 930, thereby restoring the access part of the pull-up circuit to the second impedance circuit 920 and excluding the increased first impedance circuit 930. Therefore, the original identification threshold and the identification logic are not affected.

It should be noted that the embodiments of this application do not specifically limit the specific implementation of the bypass circuit 910. In some examples, the bypass circuit 910 may include a switch tube, and the controller may control the turn-on and turn-off of the bypass circuit 910 by controlling the turn-on and turn-off of the switch tube.

Figure 8B:
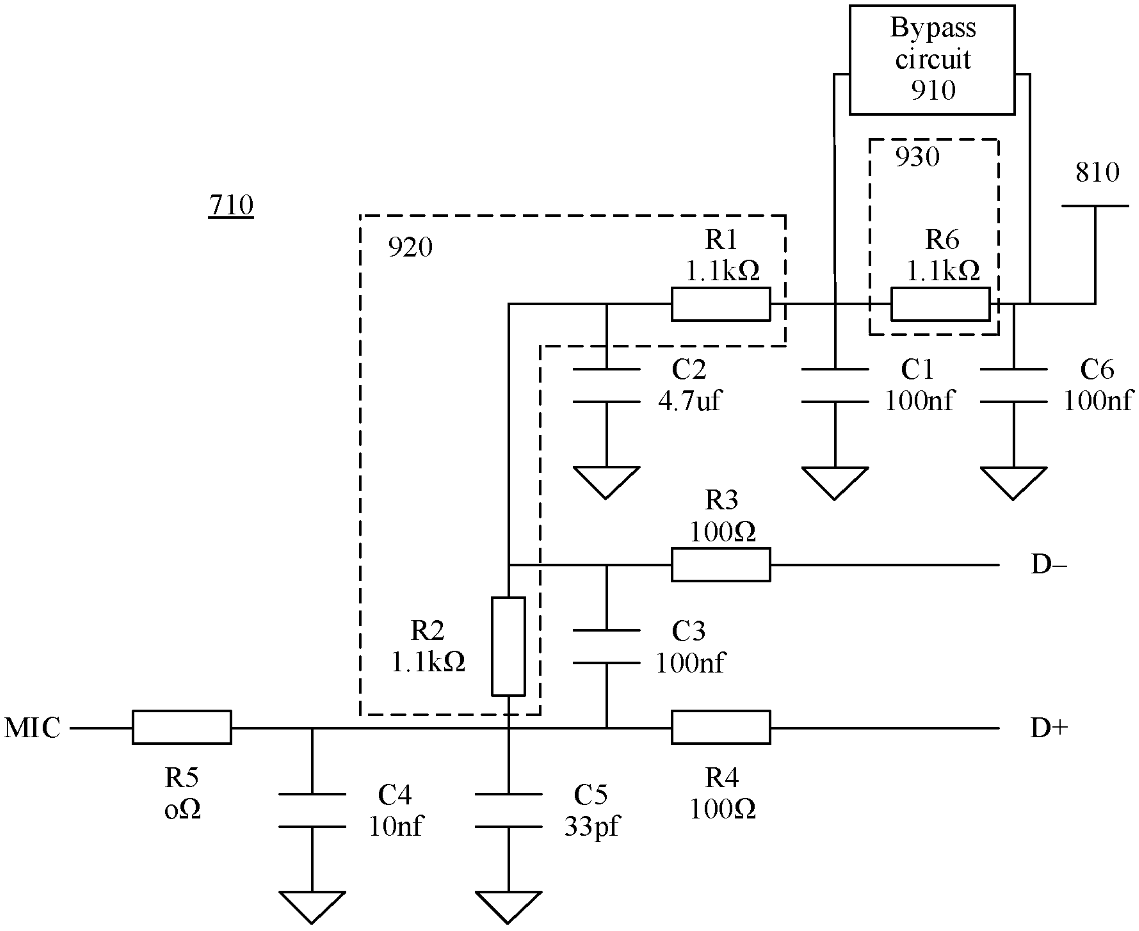
FIG. 8B is a schematic diagram of a pull-up circuit according to yet another embodiment of this application.

FIG. 8B is a schematic diagram of a pull-up circuit according to an embodiment of this application. The first impedance circuit includes a first resistor R6, and the second impedance circuit 920 and another part of the pull-up circuit are similar to those of FIG. 7B. For details, reference may be made to FIG. 7B, and details are not described herein again.

In some embodiments, after the identification is completed, the controller can also control audio paths of the left and right channels of the mobile phone and the analog earphone to be turned on, so that a user can use the earphones to listen to music, answer a call, and the like.

The following describes the value of each part of the element in the pull-up circuit in this embodiment of this application by taking the normal insertion identification threshold (900 Mv, 2650 Mv] and the reverse insertion identification threshold (9 mV, −900] of the analog earphone as examples.

In some examples, a value range of the first resistance value may be 2640 ohms to 4000 ohms, and a value range of the resistance value of the first resistor R6 may be 880 ohms to 1320 ohms. For example, the first resistance value may be 3300 ohms and the resistance value of the first resistor R6 may be 1100 ohms, thereby the resistance value of the second resistor R1 and the third resistor R2 connected in series is 2200 ohms.

In a case that the audio path between the mobile phone and the analog earphone is disconnected, when the analog earphone is normally inserted into the mobile phone, the voltage provided by the input terminal of the pull-up circuit may be 2.7 V, the total resistance of the pull-up circuit is 3300 ohms, and the total resistance of the analog earphone is about 2000 ohms. In this case, the partial voltage of the pull-up circuit is about 1.68 V, and the partial voltage of the analog earphone (that is, the MIC pin of the Type-C interface) is 1.02 V, which can fall within the normal insertion identification threshold, and can normally identify the analog earphone as the normal insertion.

When the analog earphone is reversely inserted into the mobile phone, the voltage provided by the input terminal of the pull-up circuit may be 2.7 V, the total resistance of the pull-up circuit is 3300 ohms, and the total resistance of the analog earphone is about 1000 ohms. In this case, the partial voltage of the pull-up circuit is about 2.07 V, and the partial voltage of the analog earphone (that is, the MIC pin of the Type-C interface) is 0.63 V, which can fall within the reverse insertion identification threshold, and can normally identify the analog earphone as the reverse insertion.

It should be noted that, in the above example, only the equivalent resistance of the above pull-up circuit is 3300 ohms, and the resistance of the first resistor is 1100 ohms. A person skilled in the art can choose any numerical value within the defined interval for design according to an actual need.

Based on the above, an embodiment of this application further provides an electronic device. The electronic device includes a controller, a pull-up circuit, and a Type-C interface. An output terminal of the pull-up circuit is configured to be connected to a Type-C plug of an earphone through a MIC pin of the Type-C interface. The audio path of the electronic device and the earphone is disconnected, therefore the POP sound generated when the earphone is inserted into the Type-C interface of the electronic device through the Type-C plug of the adapter cable can be eliminated. When the earphone is inserted into the Type-C interface of the electronic device through the Type-C plug, the controller of the electronic device controls the access resistance value of the pull-up circuit to be the first resistance value, and performs identification based on the voltage at the MIC pin of the Type-C interface and the normal/reverse insertion of the earphone. The controller is configured to control the access resistance value of the pull-up circuit to be a second resistance value after the identification is completed, and the first resistance value is greater than the second resistance value.

It can be seen that in the identification stage, a large resistance value of the pull-up circuit leads to a large partial voltage. When the earphone is reversely inserted, the voltage at the MIC pin of the Type-C interface may be made to fall within the reverse insertion identification threshold, and the normal/reverse insertion of the normal identification earphone can be realized. In addition, after the identification is completed, the resistance value of the pull-up circuit is restored to the original resistance value (that is, the second resistance value), which does not affect the original button function and the identification logic.

An embodiment of this application further provides a pull-up circuit. The pull-up circuit is applicable to an electronic device, where the electronic device further includes a controller and a Type-C interface. An output terminal of the pull-up circuit is configured to be connected to a Type-C plug of an earphone through a microphone MIC pin of the Type-C interface (as shown in FIG. 6). The controller is configured to control the electronic device to be disconnected from an audio path of the earphone, control an access resistance value of the pull-up circuit to be a first resistance value, and identify normal/reverse insertion of the earphone based on a voltage of the MIC pin of the Type-C interface when the earphone is inserted into the Type-C interface of the electronic device through the Type-C plug. The controller is configured to control the access resistance value of the pull-up circuit to be a second resistance value after the identification is completed, and the first resistance value is greater than the second resistance value.

In some possible implementations, an input terminal of the pull-up circuit includes a first input terminal and a second input terminal: the pull-up resistor includes a first impedance circuit and a second impedance circuit connected in series. The first input terminal is connected to the output terminal of the pull-up circuit through the first impedance circuit and the second impedance circuit connected in series; and the second input terminal is connected to the output terminal of the pull-up circuit through the second impedance circuit: the controller is further configured to control turn-on of the first input terminal and turn-off of the second input terminal when the earphone is inserted into the Type-C interface of the electronic device through the Type-C plug; and the controller is further configured to control turn-on of the second input terminal after the identification is completed. The schematic diagram of the pull-up circuit in this implementation can be referred to the introduction of FIG. 7A. Details are not described herein again.

In some possible implementations, the pull-up circuit includes a bypass circuit and a first impedance circuit and a second impedance circuit connected in series; the bypass circuit and the first impedance circuit are connected in parallel between the input terminal of the pull-up circuit and the second impedance circuit: the controller is further configured to control the bypass circuit to disconnect when the earphone is inserted into the Type-C interface of the electronic device through the Type-C plug; and the controller is further configured to control turn-on of the bypass circuit after the identification is completed. The schematic diagram of the pull-up circuit in this implementation can be referred to the introduction of FIG. 8A. Details are not described herein again.

In some possible implementations, the pull-up circuit further includes a first capacitor, where a first end of the first impedance circuit is configured to be connected to the second impedance circuit, the first impedance circuit includes a first resistor, a first end of the first capacitor is connected to a first end of the first impedance circuit, a second end of the first capacitor is grounded, and a second end of the first resistor is the first end of the first impedance circuit. The schematic diagram of the pull-up circuit in this implementation can be referred to the introduction of FIG. 7B or FIG. 8B. Details are not described herein again.

In some possible implementations, the first resistance value is in a range of 2640 ohms to 4000 ohms.

In some possible implementations, a resistance value of the first resistor is in a range of 880 ohms to 1320 ohms.

In some possible implementations, the first resistance value is 3300 ohms, and the resistance value of the first resistor is 1100 ohms.

Figure 9:
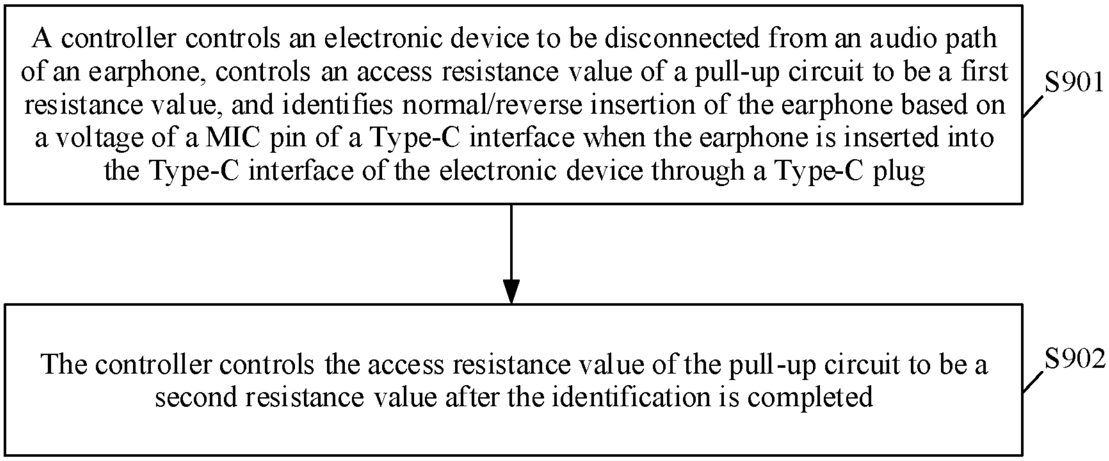
FIG. 9 a flowchart of a method for suppressing a POP sound of an earphone according to an embodiment of the present application.

An embodiment of this application further provides a method for suppressing a POP sound of an earphone. FIG. 9 a flowchart of a method for suppressing a POP sound of an earphone according to an embodiment of the present application. The method is applicable to an electronic device, where the electronic device includes a controller, a pull-up circuit, and a Type-C interface. An output terminal of the pull-up circuit is configured to be connected to a Type-C plug of an earphone through a microphone MIC pin of the Type-C interface. The method includes the following steps.

S901: The controller controls the electronic device to be disconnected from an audio path of the earphone, controls an access resistance value of the pull-up circuit to be a first resistance value, and identifies normal/reverse insertion of the earphone based on a voltage of the MIC pin of the Type-C interface when the earphone is inserted into the Type-C interface of the electronic device through the Type-C plug.

S902: The controller controls the access resistance value of the pull-up circuit to be a second resistance value after the identification is completed.

The first resistance value is greater than the second resistance value.

In some possible implementations, the method further includes: controlling, by the controller, turn-on of the audio path.

Based on the above, an embodiment of this application provides a method for suppressing a POP sound of an earphone. In this method, when the earphone is inserted into the Type-C interface of the electronic device through the Type-C plug, the controller disconnects the audio path, thereby suppressing the POP sound of the earphone. Next, the controller increases the access resistance value of the pull-up circuit to a higher first resistance value. In this way, even when the earphone is reversely inserted into the electronic device through the Type-C plug, since the voltage at the MIC pin of the Type-C interface is lowered, and the reverse insertion identification threshold is a lower voltage range, the voltage at the MIC pin of the Type-C interface falls within the reverse insertion identification threshold, so that the reverse insertion of the earphone can be identified. After the identification is completed, the controller controls the access resistance value of the pull-up circuit to be the second resistance value (increase the previous resistance value), so that there is no need to change an original identification threshold and an identification logic, and the function of the original button is not affected.

An embodiment further provides a computer-readable storage medium, where the computer-readable storage medium includes an instruction, and when the instruction is run on an electronic device, the electronic device is enabled to perform related method steps in the figure, to perform the methods in the foregoing embodiments.

This embodiment further provides a computer program product including an instruction, when the computer program product runs on an electronic device, the electronic device is enabled to perform related method steps in FIG. 9, to perform the methods in the foregoing embodiments.

In the several embodiments provided in this embodiment, it should be understood that the method of the pull-up circuit and the electronic device to suppress the earphone POP sound method may be implemented in other manners.

When the integrated unit is implemented in the form of a software functional unit and sold or used as an independent product, the integrated unit may be stored in a computer-readable storage medium. Based on such an understanding, the technical solutions of the embodiments essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments. The storage medium includes any medium that can store program code, such as a flash memory, a removable hard disk, a read-only memory, a random access memory, a magnetic disk, or a compact disc.

The foregoing descriptions are merely specific embodiments of this application, and are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. An electronic device, comprising a controller, a pull-up circuit, and a universal serial bus Type-C interface, wherein an output terminal of the pull-up circuit is configured to be connected to a Type-C plug of an earphone through a microphone MIC pin of the Type-C interface;

the controller is configured to control the electronic device to be disconnected from an audio path of the earphone, control an access resistance value of the pull-up circuit to be a first resistance value, and identify normal/reverse insertion of the earphone based on a voltage of the MIC pin of the Type-C interface when the earphone is inserted into the Type-C interface of the electronic device through the Type-C plug; and the controller is further configured to control the access resistance value of the pull-up circuit to be a second resistance value after the identification is completed, and the first resistance value is greater than the second resistance value.

2. The electronic device according to claim 1, wherein an input terminal of the pull-up circuit comprises a first input terminal and a second input terminal, the pull-up circuit comprises a first impedance circuit and a second impedance circuit connected in series, the first input terminal is connected to the output terminal of the pull-up circuit through the first impedance circuit and the second impedance circuit connected in series, and the second input terminal is connected to the output terminal of the pull-up circuit through the second impedance circuit;

the controller is further configured to control turn-on of the first input terminal and turn-off of the second input terminal when the earphone is inserted into the Type-C interface of the electronic device through the Type-C plug; and the controller is further configured to control turn-on of the second input terminal after the identification is completed.

3. The electronic device according to claim 1, wherein the pull-up circuit comprises a bypass circuit and a first impedance circuit and a second impedance circuit connected in series, and the bypass circuit and the first impedance circuit are connected in parallel between an input terminal of the pull-up circuit and the second impedance circuit;

the controller is further configured to control the bypass circuit to be disconnected when the earphone is inserted into the Type-C interface of the electronic device through the Type-C plug; and the controller is further configured to control turn-on of the bypass circuit after the identification is completed.

4. The electronic device according to claim 1, wherein the controller is further configured to control turn-on of the audio path after the identification is completed.

5. The electronic device according to claim 2, wherein the pull-up circuit further comprises a first capacitor, a first end of the first impedance circuit is configured to be connected to the second impedance circuit, the first impedance circuit comprises a first resistor, a first end of the first capacitor is connected to a first end of the first resistor, a second end of the first capacitor is grounded, and a second end of the first resistor is the first end of the first impedance circuit.

6. The electronic device according to claim 5, wherein a resistance value of the first resistor is in a range of 880 ohms to 1320 ohms.

7. The electronic device according to claim 6, wherein the first resistance value is 3300 ohms, and the resistance value of the first resistor is 1100 ohms.

8. The electronic device according to claim 1, wherein the first resistance value is in a range of 2640 ohms to 4000 ohms.

9. A pull-up circuit, applicable to an electronic device, wherein the electronic device further comprises a controller and a Type-C interface;

an output terminal of the pull-up circuit is configured to be connected to a Type-C plug of an earphone through a microphone MIC pin of the Type-C interface;

the controller is configured to control the electronic device to be disconnected from an audio path of the earphone, control an access resistance value of the pull-up circuit to be a first resistance value, and identify normal/reverse insertion of the earphone based on a voltage of the MIC pin of the Type-C interface when the earphone is inserted into the Type-C interface of the electronic device through the Type-C plug; and the controller is configured to control the access resistance value of the pull-up circuit to be a second resistance value after the identification is completed, and the first resistance value is greater than the second resistance value.

10. The pull-up circuit according to claim 9, wherein an input terminal of the pull-up circuit comprises a first input terminal and a second input terminal, the pull-up circuit comprises a first impedance circuit and a second impedance circuit connected in series, the first input terminal is connected to the output terminal of the pull-up circuit through the first impedance circuit and the second impedance circuit connected in series, and the second input terminal is connected to the output terminal of the pull-up circuit through the second impedance circuit;

the controller is further configured to control turn-on of the first input terminal and turn-off of the second input terminal when the earphone is inserted into the Type-C interface of the electronic device through the Type-C plug; and the controller is further configured to control turn-on of the second input terminal after the identification is completed.

11. The pull-up circuit according to claim 10, further comprising a first capacitor, wherein a first end of the first impedance circuit is configured to be connected to the second impedance circuit, the first impedance circuit comprises a first resistor, a first end of the first capacitor is connected to the first end of the first impedance circuit, a second end of the first capacitor is grounded, and a second end of the first resistor is the first end of the first impedance circuit.

12. The pull-up circuit according to claim 11, wherein a resistance value of the first resistor is in a range of 880 ohms to 1320 ohms.

13. The pull-up circuit according to claim 12, wherein the first resistance value is 3300 ohms, and the resistance value of the first resistor is 1100 ohms.

14. The pull-up circuit according to claim 9, wherein the pull-up circuit comprises a bypass circuit and a first impedance circuit and a second impedance circuit connected in series, and the bypass circuit and the first impedance circuit are connected in parallel between an input terminal of the pull-up circuit and the second impedance circuit;

the controller is further configured to control the bypass circuit to be disconnected when the earphone is inserted into the Type-C interface of the electronic device through the Type-C plug; and the controller is further configured to control turn-on of the bypass circuit after the identification is completed.

15. The pull-up circuit according to claim 9, wherein the first resistance value is in a range of 2640 ohms to 4000 ohms.

16. A method for suppressing a POP sound of an earphone, applicable to an electronic device, wherein the electronic device comprises a controller, a pull-up circuit, and a Type-C interface, an output terminal of the pull-up circuit is configured to be connected to a Type-C plug of an earphone through a microphone MIC pin of the Type-C interface; the method comprises:

controlling, by the controller, the electronic device to be disconnected from an audio path of the earphone, controlling an access resistance value of the pull-up circuit to be a first resistance value, and identifying normal/reverse insertion of the earphone based on a voltage of the MIC pin of the Type-C interface when the earphone is inserted into the Type-C interface of the electronic device through the Type-C plug; and controlling, by the controller, the access resistance value of the pull-up circuit to be a second resistance value after the identification is completed, wherein the first resistance value is greater than the second resistance value.

17. The method according to claim 16, wherein after the identification is completed, the method further comprises:

controlling, by the controller, turn-on of the audio path.

* * * * *